(12) United States Patent
Schlosser et al.

(10) Patent No.: US 7,127,815 B2
(45) Date of Patent: Oct. 31, 2006

(54) METHOD OF MANUFACTURING A CORIOLIS FLOWMETER

(75) Inventors: Martin Andrew Schlosser, Boulder, CO (US); Mark James Bell, Arvada, CO (US); Matthew Glen Wheeler, Arvada, CO (US); Daniel Patrick McNulty, Westminster, CO (US); Leland Charles Leber, Fort Collins, CO (US)

(73) Assignee: Emerson Electric Co., St. Louis, MO (US)

( * ) Notice: Subject to any disclaimer, the term of this patent is extended or adjusted under 35 U.S.C. 154(b) by 56 days.

(21) Appl. No.: 09/994,257

(22) Filed: Nov. 26, 2001

(65) Prior Publication Data

US 2003/0097882 A1 May 29, 2003

(51) Int. Cl.
*G01F 1/84* (2006.01)
*B21D 51/16* (2006.01)
*B23P 17/00* (2006.01)

(52) U.S. Cl. .............................. 29/890.09; 73/861.354; 73/861.355; 73/861.357

(58) Field of Classification Search ................. 29/450, 29/459, 505, 516, 447, 890.09; 73/861.355, 73/861.356, 861.357, 861.534, 861.354
See application file for complete search history.

(56) References Cited

U.S. PATENT DOCUMENTS

RE31,450 E    11/1983   Smith
4,559,833 A *  12/1985   Sipin ...................... 73/861.355
4,856,346 A *   8/1989   Kane ...................... 73/861.355
4,934,195 A *   6/1990   Hussain .................. 73/861.355
5,131,280 A *   7/1992   Lew ....................... 73/861.355
5,261,284 A *  11/1993   Hopkinson ............. 73/861.355
5,287,754 A     2/1994   Kazakis
5,403,533 A     4/1995   Meier
5,672,832 A *   9/1997   Cucci et al. .............. 73/861.52
5,753,827 A *   5/1998   Cage ..................... 73/861.356
5,918,285 A     6/1999   Van der Pol
6,336,369 B1*   1/2002   Gomi et al. ........... 73/861.357
6,336,370 B1*   1/2002   van der Pol ........... 73/861.357
6,450,042 B1    9/2002   Lanham et al.
6,711,958 B1*   3/2004   Bitto et al. ............. 73/861.355
2001/0006007 A1  7/2001   Davies et al.
2001/0035055 A1* 11/2001  Drahm et al. .......... 73/861.355
2003/0097881 A1  5/2003   Schlosser et al.
2003/0097883 A1  5/2003   Pawlas et al.

FOREIGN PATENT DOCUMENTS

DE         41 19 396 C1    8/1992
WO       WO 01/65213 A1 *  9/2001

* cited by examiner

Primary Examiner—Jermie E. Cozart
(74) Attorney, Agent, or Firm—The Ollila Law Group LLC

(57) ABSTRACT

A method of manufacturing a Coriolis flowmeter for the measurement of a process material requiring an ultra high level of purity. This is achieved by forming the entire flow path of the Coriolis flow meter from a PFA plastic material that does not transfer ions from the Coriolis flowmeter to the process material flowing through the flowmeter.

22 Claims, 12 Drawing Sheets

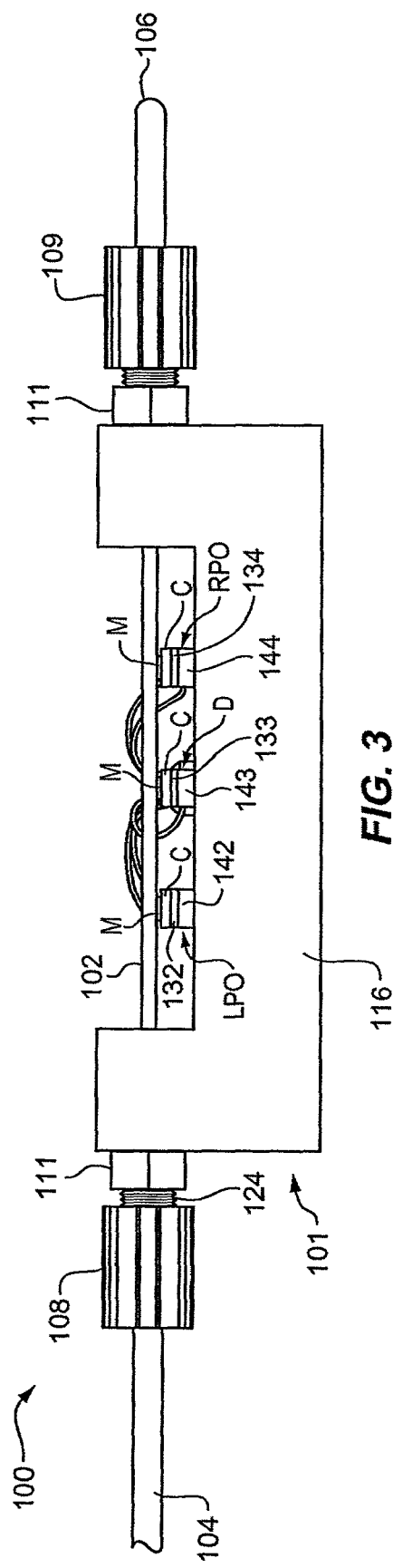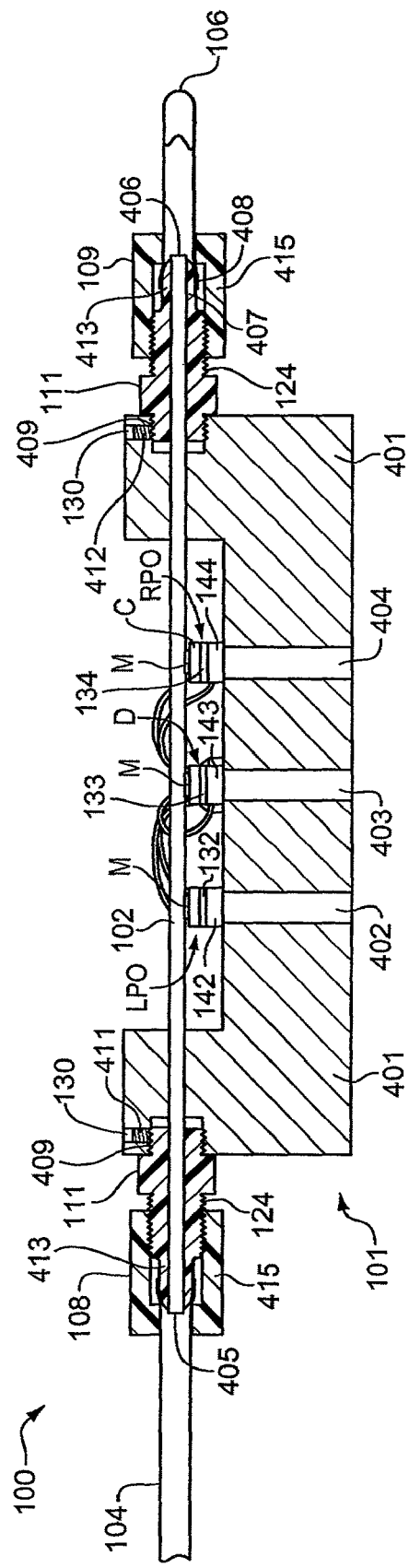

METHOD OF MANUFACTURING A CORIOLIS FLOWMETER

FIELD OF THE INVENTION

This invention relates to a method of manufacturing a Coriolis flowmeter that measures a flow of process material having an ultra high level of purity.

PROBLEM

It is known to use Coriolis effect mass flowmeters to measure mass flow and other information pertaining to materials flowing through a pipeline as disclosed in U.S. Pat. No. 4,491,025 issued to J. E. Smith, et al. of Jan. 1, 1985 and Pat. No. Re. 31,450 to J. E. Smith of Feb. 11, 1982. Flowmeters have one or more flow tubes of a straight, curved or irregular configuration. Each flow tube has a set of natural vibration modes which may be of a simple bending, torsional, or twisting type. Each material filled flow tube is driven to oscillate at resonance in one of these natural modes. The natural vibration modes are defined in part by the combined mass of the flow tubes and the material within the flow tubes. If desired, a flowmeter need not be driven at a natural mode.

Material flows into the flowmeter from a connected material source on the inlet side. The material passes through the flow tube or flow tubes and exits the outlet side of the flowmeter.

A driver applies force to oscillate the flow tube. When there is no material flow, all points along a flow tube oscillate with an identical phase in the first bending mode of the flow tube. Coriolis accelerations cause each point on the flow tube to have a different phase with respect to other points on the flow tube. The phase on the inlet side of the flow tube lags the driver; the phase on the outlet side leads the driver. Pickoffs are placed on the flow tube to produce sinusoidal signals representative of the motion of the flow tube. The phase difference between two sensor signals is divided by the frequency of oscillation to obtain a delay which is proportional to the mass flow rate of the material flow.

It is known to use flowmeters having different flow tube configurations. Among these configurations are single tube, dual tube, straight tube, curved tube, and flow tubes of irregular configuration. Most of the flowmeters are made of metal such as aluminum, steel, stainless steel and titanium. Glass flow tubes are also known. In addition, all straight serial path flowmeters currently in the art are made out of metal, particularly Titanium, or are metal tubes lined with plastic, particularly PTFE or PFA.

The positive attributes of Titanium in these types of flowmeters are its high strength and low coefficient of thermal expansion (CTE). The negative attributes of Titanium are its metallic properties and cost of manufacturing. For example, in semiconductor wafer processing, metal ions are a contaminant. Metal ions in contact with the wafer areas of an integrated circuit can cause a short circuit and ruin the device. Also, a Titanium flowmeter is difficult and expensive to produce.

Flow tubes lined with PFA, as disclosed in U.S. Pat. No. 5,403,533 to Dieter Meier, attempted to combine the positive attributes of both technologies but encountered new challenges that could not be solved until the present invention. Metal flow tubes lined with PFA still allowed metal ions to migrate through the thin coating layer of PFA and into the flow stream, causing contamination. Also, the flow tube material and the PFA liner had different thermal properties. This caused the PFA liner to disengage from the flow tube creating leaks and performance problems. The manufacturing process for lining the metal flow tubes with PFA is also extremely costly. The prior art also suggests plastic flow tubes and plastic flowmeters. This includes prior art in which the entirety of the flowmeter is plastic as well as that in which only the flow tube is formed of plastic. Much of this prior art is directed to metal flowmeters and merely contains an assertion that a flowmeter may be made of various materials such as steel, stainless steel, titanium or plastic. This prior art is not instructive in so far as concerns the disclosure of a plastic Coriolis flowmeter that can accurately output information over a range in operating conditions including temperature.

The mere substitution of a plastic flow tube for a metal flow tube will produce a structure that looks like a flowmeter. However, the structure will not function as a flowmeter to generate accurate output information over a useful range of operating conditions. The mere assertion that a flowmeter could be made out of plastic is nothing more than the abstraction that plastic can be substituted for metal. It does not teach how a plastic flowmeter can be manufactured to generate accurate information over a useful range of operating conditions.

It is a problem in some applications that the typical Coriolis flow meter may contaminate the process material. This is undesirable for systems in which material of an ultra high level of purity must be delivered by the flowmeter to a user application. This is the case in the fabrication of semi-conductor wafers which requires the use of a process material that is free of contaminants including ions migrating from the tubes of the process material flow path. In such applications, the flow tube can be a source of contaminants. The metal walls of a flow tube can release ions into the process material flow. The released ions can cause the chips on a semi-conductor wafer to be defective. The same is true for a glass flow tube which can release the lead ions from the glass into the process material flow. The same is also true for the flow tubes formed of conventional plastics.

A plastic termed PFA is free from this objection since the material of which it is composed does not release deleterious ions into the material flow. The use of PFA for a flow tube is suggested in U.S. Pat. No. 5,918,285 to Vanderpol. This suggestion is incidental to the Vanderpol disclosure since the patent discloses no information regarding how a flowmeter having a PFA flow tube could be manufactured to generate accurate flow information.

SOLUTION

The above and other problems are solved and an advance of the art is achieved by the present invention which discloses a Coriolis flowmeter having at least one flow tube formed of perfluoroalkoxy copolymer (PFA) plastic which is coupled to a driver and to at least one pick-off sensor to enable the PFA flow tube to function as part of Coriolis flowmeter that can provide accurate output information over range of operating conditions for a material flow and ultra high purity suitable for use in applications such as semiconductor fabrication and the like which require the material flow to be free of contaminants and to the ionic level.

A flow path constructed entirely of PFA has many of the benefits of Titanium and PFA lined flow tubes without the drawbacks. PFA is a fluoropolymer with superior chemical resistance, little metal ion release, low particle generation, and is manufacturable without expending large amounts of capital. PFA material is strong and can be extruded into high quality thin wall tubing. Thin-walled PFA tubing has low flexural stiffness enabling a higher sensitivity to mass flow rate and improved immunity to elastic dynamic interaction between the flow tube and the process pipeline. The material and physical properties of PFA allow larger tube vibration amplitudes at higher stress levels and resulting near infinite fatigue life span. Also, the higher vibration amplitude allows the use of small low-mass transducers, which in turn improves density sensitivity and immunity to mount variation.

A first preferred exemplary embodiment of the invention comprises a flowmeter having a single PFA plastic flow tube vibrationally connected to a massive metal base which vibrationally balances the end nodes of the flow tube. In this embodiment, the base is U-shaped and the plastic flow tube extends through holes in the outer portion of the leg of the U. The plastic flow tube is affixed to the base structure by means of an O-ring or an appropriate adhesive, particularly cyanoacrylate, which surrounds the flow tube and rigidly adheres the flow tube to the metal base. The center of the flow tube is affixed to an electro-magnetic driver which receives a drive signal from suitable meter electronics to vibrate the flow tube transversely to the longitudinal access of the flow tube. The flow tube is also coupled to pick-off sensors which detect the Coriolis response of the material flow within the vibrating flow tube. Connected to the base and terminating the flow tube are process connections, also made out of PFA.

PFA is a fluorinated polymer that is chemically inert and has a very low surface energy, making it difficult to bond to using common adhesives or solvents. In order to facilitate the bonding between the PFA components of the flowmeter and non-PFA components. A preferred method of manufacturing includes a process whereby the PFA components are etched. Etching changes the exterior surface chemistry of the PFA components allowing them to be bonded to non-PFA components. The etching process entails submersing the PFA components into a heated bath containing a glycol diether, preferably diglyme-sodium naphthalene, and gently agitate the PFA components for a period of time.

Another characteristic of PFA, specific to tubing, is that its method of manufacture results in tubing that has inherent bends or curvature that need to be eliminated from the tubing prior to manufacturing it into a flowmeter. A preferred method of eliminating unwanted curvatures in the tubing prior to processing is to straighten the flow tube through an annealing process. The annealing process comprises placing the flow tube in a straightening fixture. The fixture restrains the tube in a straight form suitable for processing into a flowmeter. The flow tube and fixture are the heated for a period of time and then removed and allowed to cool to room temperature. Upon reaching room temperature the flow tubes are removed from the fixture resulting in a straight flow tube.

As described in the first preferred embodiment, the flow tube has coupled to it pick-off means. In one embodiment the pick-off means are of the coil/magnet form. The magnet is attached to the flow tube using an adhesive and the coil is attached to the base using either an adhesive or mechanical connection. In an alternative embodiment, the pick-offs are optical devices which send and receive a light beam and which is modified by the motion of the flow tube. In order to facilitate the use of optical pick-offs potions of the flow tube are made opaque. This allows the light to be reflected off the flow tube or absorbed by the opaque coating instead of being passed through the normally translucent flow tube. The flow tube can be made opaque through various means including using coatings or paints. The optical sensing embodiment offers the advantage of lighter weight on the vibrating flow tube.

As described in the first preferred embodiment the flow tube is coupled to a process connection to form a flow path of PFA. In a further embodiment this connection is achieved by flaring the flow tube so as to allow it to be inserted over the nipple of the process connection. In another embodiment the flow tube is inserted into the thru-hole of the process connection and sealed at the face of the process connection.

In a preferred embodiment the tube is sealed to the face of the process connection by the process of laser welding. Laser welding is a non-contact form of welding that generates heat at the interface between the flow tube and the face of the process connection. Other methods of sealing the flow tube to the face of the process connection are heated tip welding, ultrasonic welding, and adhesives.

In addition to the tube being coupled to the process connection the process connection is also coupled to the base. The preferred method of coupling the process connection to the base is to form a hole in the base and secure the end of the process connection into the hole. The process connection can be secured by tapping the base hole and threading the process connection end into the tapped hole. An alternative to the above method is to simply bond the process connection end into the base hole using an adhesive. An additional method of securing the process connection to the base is to form a locking hole in the base. The hole is formed such that the centerline of the locking hole intersects with the centerline of the receiving hole. After the holes are formed and the process connection end is inserted into the receiving hole, a locking mechanism is inserted in to locking hole to secure the process connection. A preferred embodiment for locking the process connection into the receiving hole is to tap the locking hole and thread into the locking hole a set screw that what compress the process connection and prevent movement.

Other flow tube configurations are provided in accordance with other embodiment of the inventions. The invention may be practiced with the use of dual flow tubes vibrating in phase opposition. These dual tubes may either be of the straight type, they may be u-shaped, or they may be of an irregular configuration. The use of dual flow tubes is advantageous in that it provides a dynamically balanced structure and reduces the mass of the base required to mount the flow tubes.

In accordance with yet another embodiment, when dual straight flow tubes are used, they may be mounted on the base and vibrated in phase opposition in either a horizontal plane or a vertical plane. Vibration in a horizontal plane perpendicular to the bottom surface of the U-shaped base eliminates vertical shaking of the flowmeter structure but permits horizontal shaking if the dual flow tubes are not dynamically balanced. The mounting of the flow tubes in a vertical plane with respect to each other limit any undesired vertical vibrations.

An additional embodiment that can be associated with any tube configuration is the implementation of a temperature measurement device. A preferred embodiment is the use of a Resistive Temperature Device (RTD) attached to a flow tube. In accordance with another embodiment the temperature can be measured using an infrared temperature measurement device. The benefits to this device is that it is non-contact and can be located off the tube, thereby reducing mass on the tube.

In summary, the flowmeter embodying the present invention is advantageous in that it provides for the measurement and delivery of an ultra pure process material in applications that require the delivered material to be free of contamination. This level of purity is provided by the use of a PFA plastic flow tube which is chemically inert and which is superior to metals and glass permit ion transfer from the flow tube material to the processed material. The processed material may typically comprise a slurry which is an organic compound used as a polishing agent in the fabrication of wafers in the semi-conductor industry. This polishing operation serves to provide a flat surface for the wafers. The polishing operation can take from 60 to 90 seconds and during this time the slurry must be free from any contaminants including ions transferred from the flow tube material to the slurry. The deposit of even a single undesired ion onto a semi-conductor wafer can short circuit all or a portion of the wafer and render it useless.

It can be seen that an aspect of the invention is a method of manufacturing a Coriolis flowmeter adopted to extend a received process material flow having an ultra high level of purity free from contamination due to ion transfer from said Coriolis flow meter to said process material; said method comprising the steps of:

coupling a flow tube means to a base;
affixing a driver to said flow tube means;
coupling a pick-off means to said flow tube means; and
affixing inlet and outlet ends of said flow tube means to at least one process connection to form an ultra pure flow path for a process material flow through said flow tube means.

Preferably said step of coupling a flow tube means to said base further comprises the step of using said flow tube means formed from PFA to maintain said process material flow free from contamination due to ion transfer from material of a flow tube to process material.

Preferably said step of coupling said flow tube to said base is proceeded by the step of etching said flow tube to create a surface suitable for coupling and affixing flowmeter components.

Preferably said etching step comprises the step of using an etching solution containing a glycol diether.

Preferably said etching step comprises the step of heating said etching solution to an elevated temperature.

Preferably said etching step comprises the step of agitating said flow tube means in said etching solution.

Preferably said step of coupling said flow tube to a base is proceeded by the step of straightening said flow tube means to eliminate any inherent curvature or unwanted residual bends.

Preferably said straightening step comprises the steps of:
placing said flow tube means in a straightening fixture;
heating said flow tube means and said straightening fixture;
cooling said flow tube means and said straightening fixture;
removing said flow tube means from said straightening fixture.

Preferably said step of joining said flow tube means to said base comprises the step of attaching said flow tube means to said base using adhesive.

Preferably said step of attaching said flow tube means to said base using said adhesive comprises the step of using cyanoacrylate adhesive.

Preferably said step of joining said flow tube means to said base comprises the step of coupling said flow tube to said base using an O-ring.

Preferably said step of affixing said driver means to said flow tube means further comprises the step of attaching said driver means to said flow tube means using adhesive.

Preferably said step of affixing said driver means to said flow tube means further comprises the step of using cyanoacrylate adhesive.

Preferably said step of affixing said pick-off means to said flow tube means further comprises the step of attaching said pick-off means to said flow tube using adhesive.

Preferably said step of affixing said pick-off means to said flow tube means further comprises the step of using cyanoacrylate adhesive.

Preferably said method of manufacturing a Coriolis flow meter further comprises coupling said at least one process connection to said base.

Preferably said step of joining said process connection to said base comprises the steps of:
forming a receiving hole into said base;
securing a fixed portion of said process connection into said receiving hole.

Preferably said step of securing said fixed portion of said process connection into said receiving hole comprises the step of adhering said fixed portion of said process connection into said receiving hole.

Preferably said step of securing said fixed portion of said process connection into said receiving hole further comprises the step of using cyanoacrylate adhesive.

Preferably said step of securing said fixed portion of said process connection into said receiving hole comprises the step of threading a fixed portion of said process connection into said receiving hole Preferably said step of securing said fixed portion of said process connection into said receiving hole comprises the steps of:
forming a locking hole whose centerline intersect the centerline of the receiving hole; and
inserting a locking mechanism into said locking hole to prevent said
fixed portion of said process connection from moving.

Preferably said step of inserting a locking mechanism into said locking hole comprises inserting a set screw that compresses said fixed portion of said process connection.

Preferably said step of coupling said process connection to said base comprises the step of adhering a fixed portion of said of said process connection onto said base.

Preferably said step of adhering a fixed portion of said of said process connection onto said base further comprises the step of using cyanoacrylate adhesive.

Preferably said step of affixing said end of said flow tube means to said at least one process connection comprises the steps of:
flaring said end of said flow tube means; and
inserting said flared end of said flow tube means onto conical stub of said at least one process connection.

Preferably said step of affixing said end of said flow tube means to said at least one process connection comprises the steps of:
inserting said end of said flow tube means through said at least one process connection until said end of said flow tube means are flush with face of said at least one process connection; and
sealing said end of said flow tube means to said face of said at least one process connection.

Preferably said step of sealing said end of said flow tube means to said face of said at least one process connection comprises the step of adhering said end of said flow tube means to said face of said at least one process connection.

Preferably said step of sealing said end of said flow tube means to said face of said at least one process connection comprises the step of ultrasonically welding said end of said flow tube means to said face of said at least one process connection.

Preferably said step of sealing said end of flow tube means to said face of said at least one process connection comprises the step of heat tip welding said end of said flow tube means to said face of said at least one process connection.

Preferably said step of sealing said end of flow tube means to said face of said at least one process connection comprises the step of laser welding said end of said flow tube means to said face of said at least one process connection.

Preferably said step of coupling said pick-off means comprises the step of making portions of said flow tube means opaque in order to facilitate use of optical pick-offs.

Preferably said Coriolis meter is characterized by affixing a temperature sensing device to said Coriolis flowmeter.

Preferably said step of affixing a temperature sensing device comprises the step of affixing a resistance temperature measuring device to said Coriolis flowmeter. Preferably said step of affixing a temperature sensing device comprises the step of affixing an infrared temperature measuring device to said Coriolis flowmeter.

An additional aspect of the invention includes, a Coriolis flowmeter for measuring a process material flow having an ultra high level of purity; said Coriolis flowmeter comprising:

a base;

flow tube means coupled to said base;

a driver affixed to said flow tube means for vibrating said flow tube means at the resonant frequency of said flow tube means with process material flow;

pick-off means coupled to said flow tube means for generating signals representing induced Coriolis deflections of the portions of said vibrating material filled flow tube means proximate said pick-off means; and at least one process connection means coupled to said flow tube means to form an ultra pure flow path for a process material to flow through.

Preferably said Coriolis flowmeter is formed of PFA to maintain said process material flow free from contamination due to ion transfer from said flow tube means to said process material.

Preferably said Coriolis flow meter comprises an O-ring for coupling said flow tube means to said base.

Preferably said Coriolis flow meter is characterized in that said process connection means is coupled to said base.

Preferably said base comprises at least one receiving hole for securing a fixed portion of said process connection means.

Preferably said receiving hole for securing a fixed portion of said process connection means is threaded.

Preferably said base comprises at least one locking hole for securing said process connection means into said receiving hole.

Preferably said locking hole for securing said process connection means into said receiving hole is threaded.

Preferably said locking hole for securing said process connection means into said receiving hole comprises a locking mechanism.

Preferably said locking mechanism for securing said process connection means into said receiving hole is a set screw.

Preferably said process connection means is of the flare connection type.

Preferably said flow tube means comprises portions that are opaque preventing light from passing through said flow tube means.

Preferably said Coriolis flowmeter further comprises a temperature sensing device.

Preferably said temperature sensing device is of the resistive type.

Preferably said temperature sensing device is of the infrared type.

DESCRIPTION OF THE DRAWINGS

These and other advantages and features of the present invention may be better understood in connection with a reading of the following detailed description thereof in connection of the drawings in which:

FIG. 3 is a front view of the embodiment of FIG. 1.

FIG. 4 is a cross-sectional view taken along lines 4—4 of FIG. 2.

DETAILED DESCRIPTION

Figure 1:
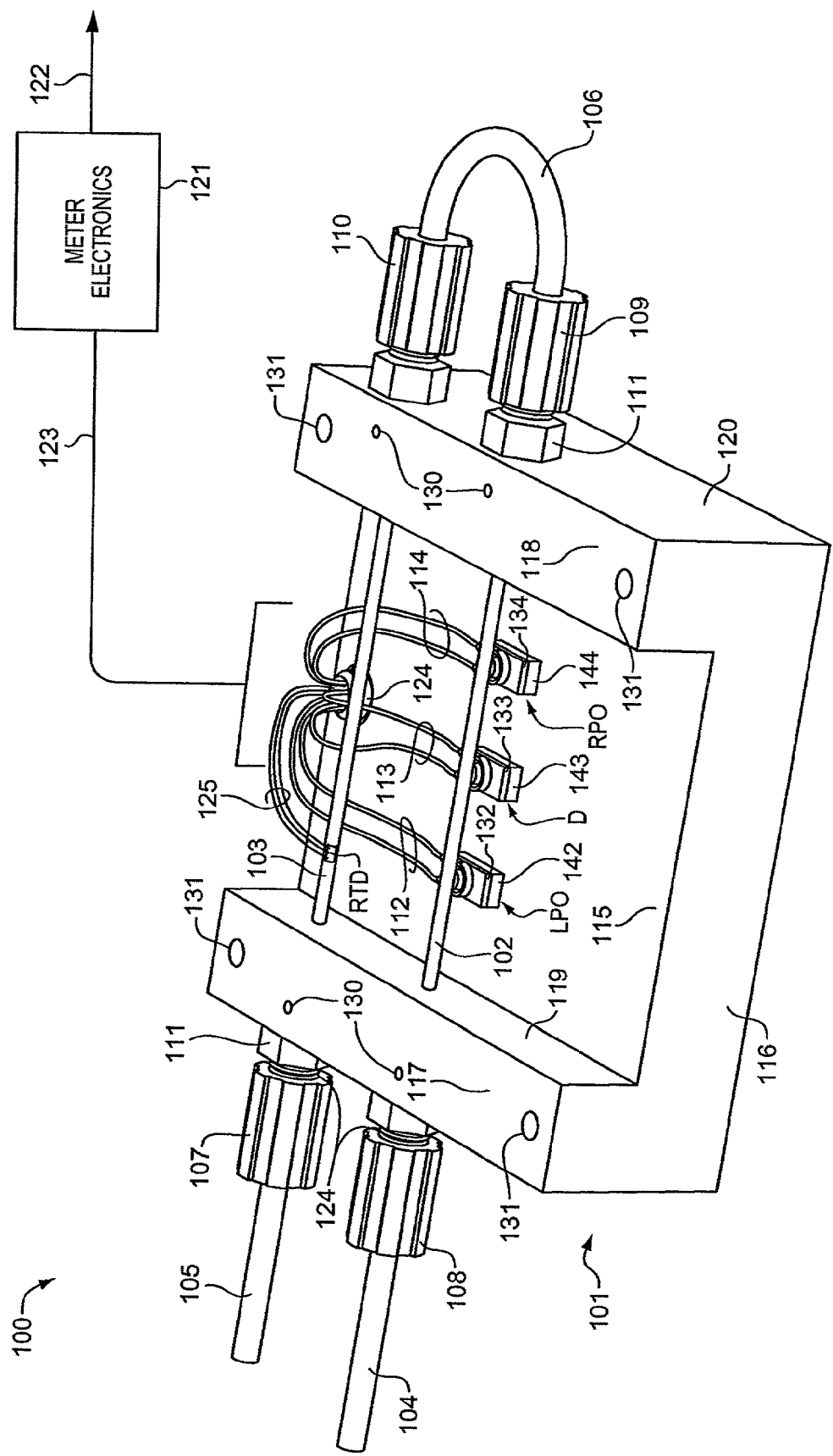
FIG. 1 discloses a perspective view of a first exemplary embodiment of the invention.

Description of FIG. 1

FIG. 1 is a perspective view of a first possible exemplary embodiment of the invention and discloses a flowmeter 100 having a flow tube 102 inserted through legs 117, 118 of base 101. Pick-offs LP0 and RP0 and driver D are coupled to flow tube 102. Flowmeter 100 receives a process material flow from supply tube 104 and extends the flow through process connection 108 to flow tube 102. Flow tube 102 is vibrated at its resonant frequency with material flow by driver D. The resulting Coriolis deflections are detected by pick-offs LP0 and RP0 which apply signals over conductors 112 and 114 to meter electronics 121. Meter electronics 121 receives the pick-off signals, determines the phase difference between, determines the frequency of oscillation and applies output information pertaining to the material flow over output path 122 to a utilization circuit not shown.

The material flow passes from flow tube 102 and through tube 106 which redirects the material flow through return tube 103 through process connection 107 to exit tube 105 which delivers the material flow to a user application. This user application may be a semiconductor processing facility. The process material may be a semiconductor slurry which is applied to the surface of a semiconductor wafer to form a flat surface. The PFA material used in the flow tubes shown on FIG. 1 ensures that the process material is free of impurities such as ions which could be transferred from the walls of metals or glass flow tubes.

In use, flow tube 102 is of a narrow diameter approximating that of a soda straw and of negligible weight such as, for example, 0.8 gram plus 0.5 gram for the process material. This excludes the weight of the magnets. The magnets associated with the pick-offs and driver have a mass of about 0.6 grams total so that the combined mass of the flow tube 102, the affixed magnets and the process material is approximately 2 grams. Vibrating flow tube 102 is a dynamically unbalanced structure. Base 102 is massive and weighs approximately 12 pounds. This provides a ratio of the mass of the base to that of a material filledflow tube of approximately 3,000 to 1. A base of this mass is sufficient to absorb vibrations generated by the dynamically unbalanced flow tube 102 with material flow.

Process connections 107, 108, 109 and 110 connect tubes 104, 105 and 106 to the ends of flow tube 102 and return tube 103. These process connections are shown in detail in FIG. 4. The process connections have a fixed portion 111 that includes threads 124. Locking holes 130 receive set screws 411 to fixably connect element 111 to base 101 as shown in FIG. 4. The movable portion of process connections 107 through 110 are threaded onto male threads 124 to connect their respective tubes to the fixed body of the process connection of which the hexagonal nut portion 111 is a part. These process connections function in a manner similar to the well known copper tubing flared process connections to connect tubes 104, 105 and 106 to ends of flow tube 102 and return tube 103. Details regarding the process connections are further shown in FIG. 4. RTD is a temperature sensor that detects the temperature of return tube 103 and transmits signals representing the detected temperature over path 125 to meter electronics.

Figure 2:
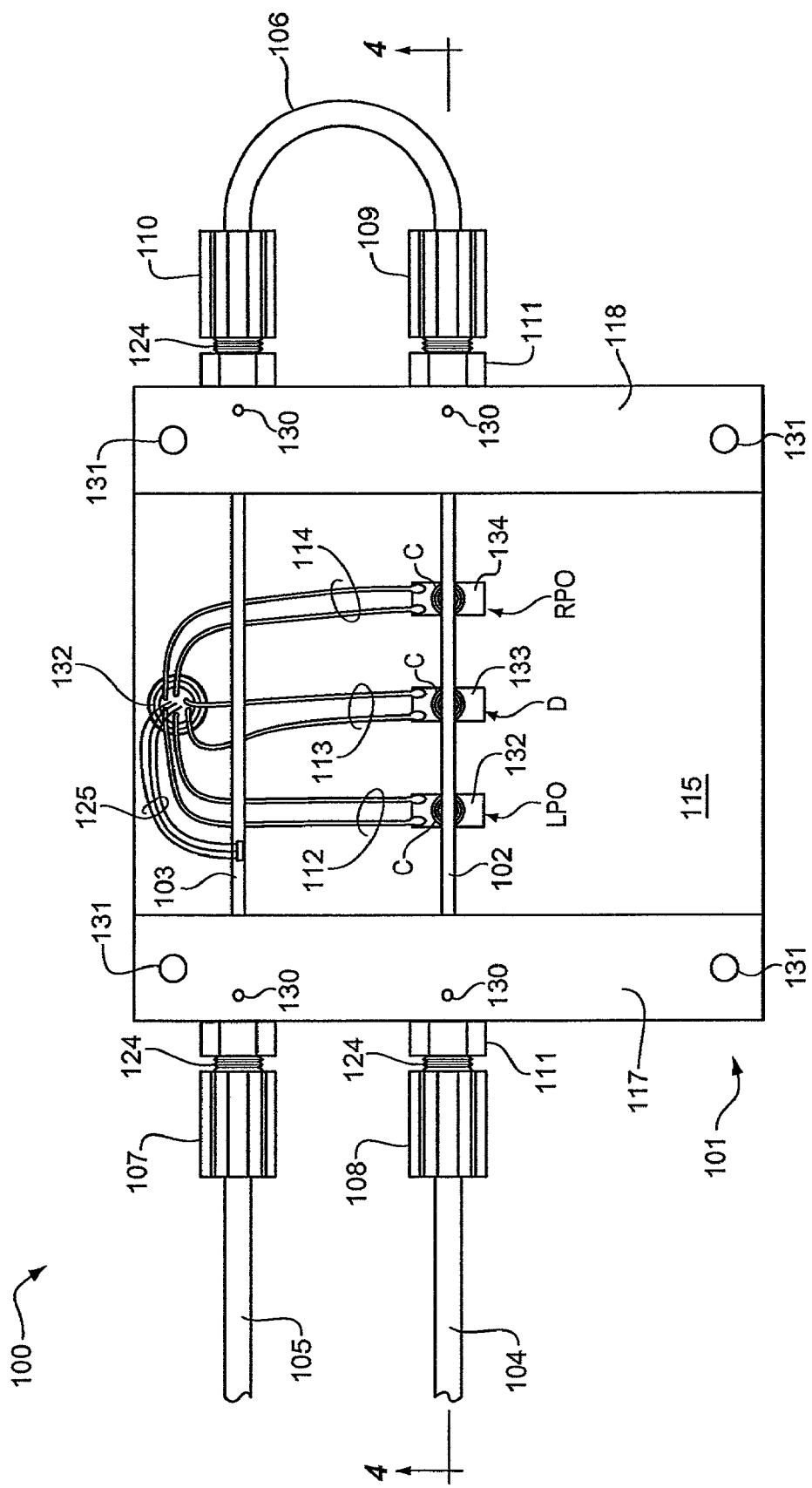
FIG. 2 is a top view of the embodiment of FIG. 1.

Description of FIG. 2

In FIG. 2 is a top view of flowmeter 100 of FIG. 1. Pick-offs LP0 and RP0 and driver D each include a coil C. Each of these elements further includes a magnet which is affixed to the bottom portion of flow tube 102 as shown in FIG. 3. Each of these elements further includes a base, such as 143 for driver D, as well as a thin strip of material, such as 133 for driver D. The thin strip of material may comprise a printed wiring board to which coil C and its winding terminals are affixed. Pickoffs LP0 and RP0 also have a corresponding base element and a thin strip fixed to the top of the base element. This arrangement facilitates the mounting of a driver or a pickoff to be accomplished by the steps of gluing a magnet M to the underside of PFA flow tube, gluing the coil C to a printed wiring board 133 (for driver D), positioning the opening in coil C around the magnet M, moving the coil C upwardly so that the magnet M fully enters the opening in coil C, then positioning base element 143 underneath the printed wiring board 133 and gluing these elements together so that the bottom of base 143 is affixed by glue to the surface of the massive base 116.

The male threads 124 of process connections 107–110 are shown on FIG. 2. The inner details of each of these elements is shown on FIG. 4. Opening 132 receives conductors 112, 113 and 114. Meter electronics 121 of FIG. 1 is not shown on FIG. 2 to minimize drawing complexity. However it is to be understood that the conductors 112, 113 and 114 extend through opening 132 and further extend over path 123 of FIG. 1 to meter electronics 121 of FIG. 1.

Description of FIG. 3

FIG. 3 shows pick-offs LP0, RP0 and driver D as comprising a magnet M affixed to the bottom portion of flow tube 102 and a coil C affixed to the base of each of elements LP0, RP0 and driver D.

Description of FIG. 4

FIG. 4 is a sectional taken along line 4—4 of FIG. 2. FIG. 4 discloses all the elements of FIG. 3 and further details of process connections 108 and 109 and O-rings 430. O-rings 430 couple flow tube 102 to base 401. FIG. 4 further discloses openings 402, 403 and 404 in base 101. The top of each of these openings extends to the lower surface of the base of pick-offs LP0, RP0 and driver D. The coil C and magnet M associated with each of these elements is also shown on FIG. 4. Meter electronics 121 of FIG. 1 is not shown on FIGS. 3 and 4 to minimize drawing complexity. Element 405 in process connection 108 is the inlet of flow tube 102; element 406 in process connection 109 is the outlet of flow tube 102.

The fixed portion 111 of process connection 108 includes male threads 409 which screw into mating threads in receiving hole 420 located in base 401 to attach fixed portion 111 to segment 401 of base 101. The fixed portion of process connection 109 on the right is similarly equipped and attached by threads 409 into receiving hole 420 located in element 401 of base 101.

Fixed element 111 of process connection 108 further includes a threaded portion 124 whose threads receive the movable portion 415 of process connection 108. Process connection 109 is similarly equipped. Fixed element 111 of process connection 108 further includes on its left a conical stub 413 which together with movable element 415 acts as a flare fitting to force the right end of input tube 104 over the conical stub 413 of fixed portion 111. This creates a compression fitting that sealably affixes the flared opening of supply tube 104 onto the conical stub portion 413 of fixed portion 111 of the process connection. The inlet of flow tube 102 is positioned in process connection fixed portion 111 and is flush with face 425 of stub 413. By this means, the process material delivered by supply tube 104 is received by inlet 405 of flow tube 102. The process material flows to the right through flow tube 102 to fixed portion 111 of process connection 109 where the outlet 406 of flow tube 102 is flush with face 425 of stub 413. This sealably affixes the outlet of flow tube 102 to connector 109. The other process connections 107 and 110 of FIG. 1 are identical to those described for the details of process connections 108 and 109 on FIG. 4.

Figure 5:
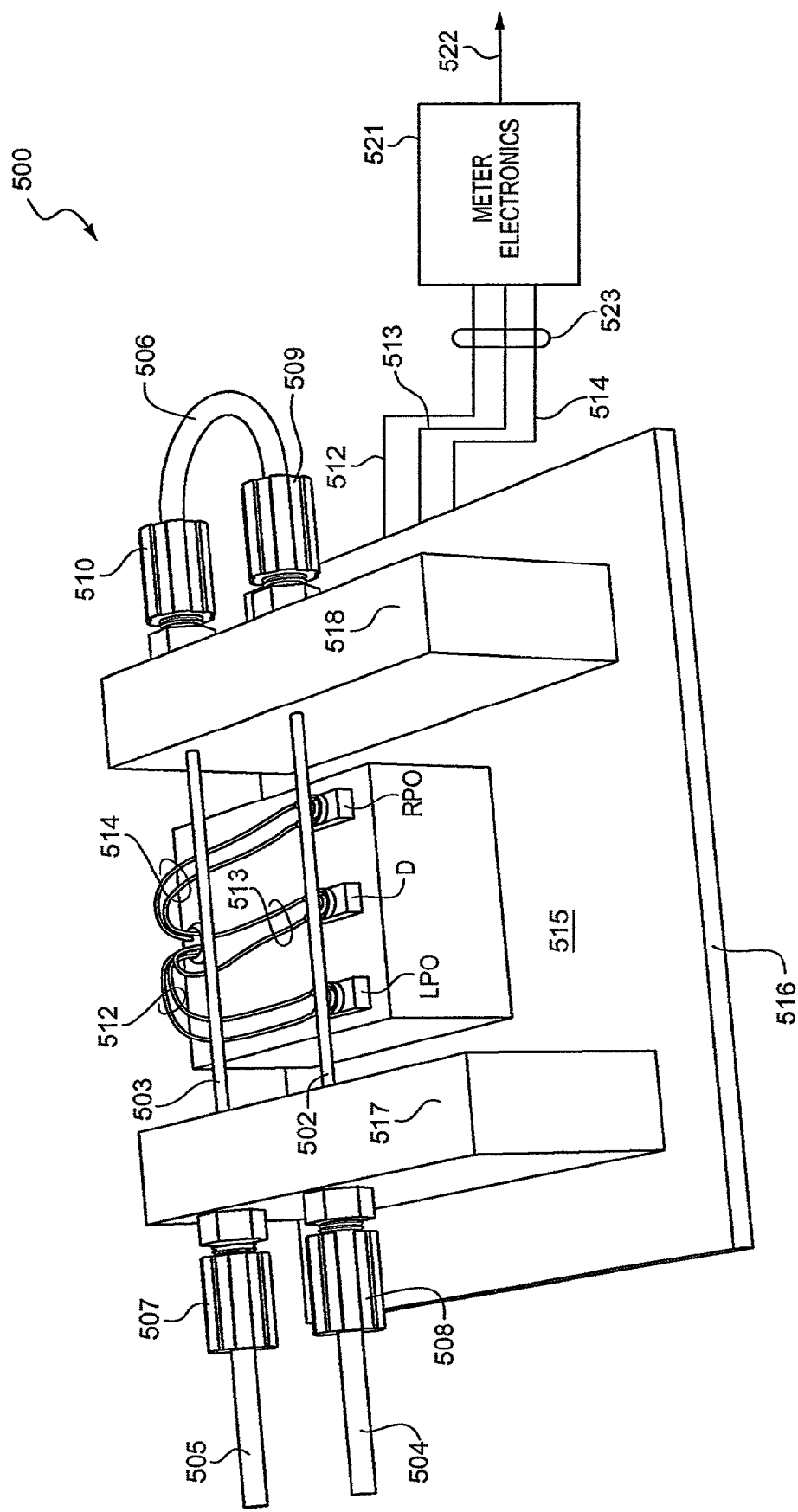
FIG. 5 is a perspective view of an alternative embodiment having a pair of base elements.

Description of FIG. 5

FIG. 5 discloses flowmeter 500 as an alternative embodiment of the invention similar to that of FIG. 1 except that the base of the flowmeter 500 is not a single element and comprises separate structures 517 and 518. Flow tube 502 and return tube 503 extend through the elements 517, 518 to process connections 507 through 510 which are comparable in every respect to process connections 107 through 110 of FIG. 1. Flowmeter base elements 517, 518 are separate and each is of sufficient mass to minimize the vibrations imparted by driver D to the dynamically unbalanced structure comprising flow tube 502. Base elements 517 and 518 rest on surface 515 of element 516 which supports base elements 517 and 518.

All elements shown on FIG. 5 operate in the same manner as do their corresponding elements on FIG. 1. This correspondence is shown by the designation of each element which differs only in that the first digit of the part designation of the element. Thus, supply tube 104 on FIG. 1 corresponds to supply tube 504 on FIG. 5.

Figure 6:
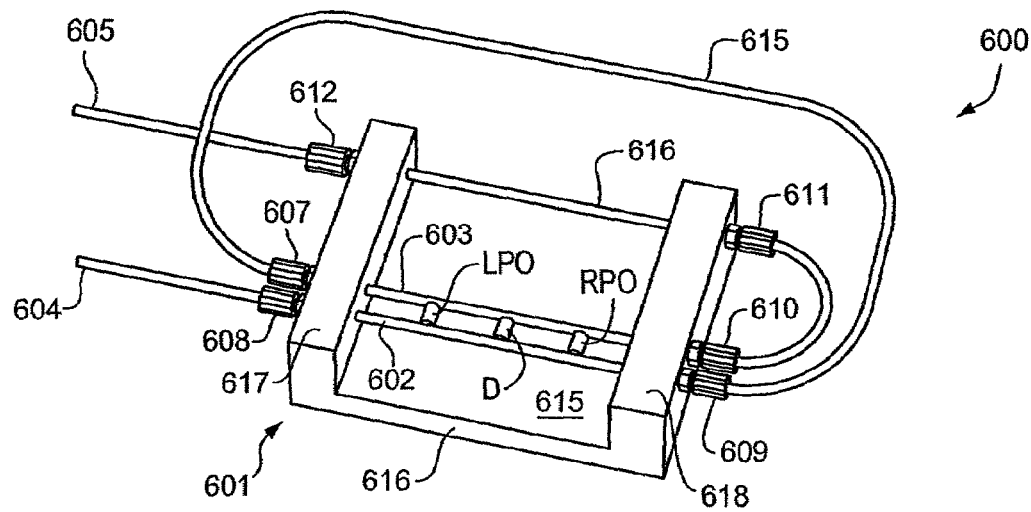
FIG. 6 discloses a dynamically balanced flowmeter having a U-shaped base.

Description of FIG. 6

FIG. 6 discloses yet another alternative embodiment of the invention as comprising flowmeter 600 which is different from the embodiment of FIG. 1 in that flowmeter 600 has two active flow tubes 602 and 603 which comprise a dynamically balanced structure that does not require the massive base such as base 101 of FIG. 1. Base 601 may have significantly less mass than that of FIG. 1. Flowmeter 600 has process connections 607 through 610 comparable to process connections 107–110 of FIG. 1. In addition, it has process connections 611, 612. Process material is received by flowmeter 600 from a supply tube 604. The material extends via a process connection 608 to the left end of flow tube 602. Flow tube 602 extends through leg 618 of base 601 and process connection 609 by means where it is connected to tube 615 which loops back via process connection 607 to flow tube 603. Flow tube 603 is vibrated in phase opposition to flow tube 602 by driver D. The Coriolis response of the vibrating flow tubes 602 and 603 is detected by pick-offs LP0 and RP0 and transmitted via conductors not shown to meter electronics element also not shown to minimize drawing complexity.

The material flow through tube 603 proceeds to the right and extends via process connection 610 to tube 606 which loops back through process connection 611 and tube 616, process connection 612 to return flow tube 605 which delivers the material flow to the application process of the end user.

Flow tube 600 is advantageous in that it comprises a dynamically balanced structure of flow tubes 602 and 603 formed of PFA material. The dynamically balanced structure is advantageous in that the massive base 101 of FIG. 1 is not required. Base 601 may be of conventional mass and vibrating PFA tubes 602 and 603 to provide output information pertaining to the material flow. The PFA flow tubes ensure that the material flow have an ultra high level of purity.

Figure 7:
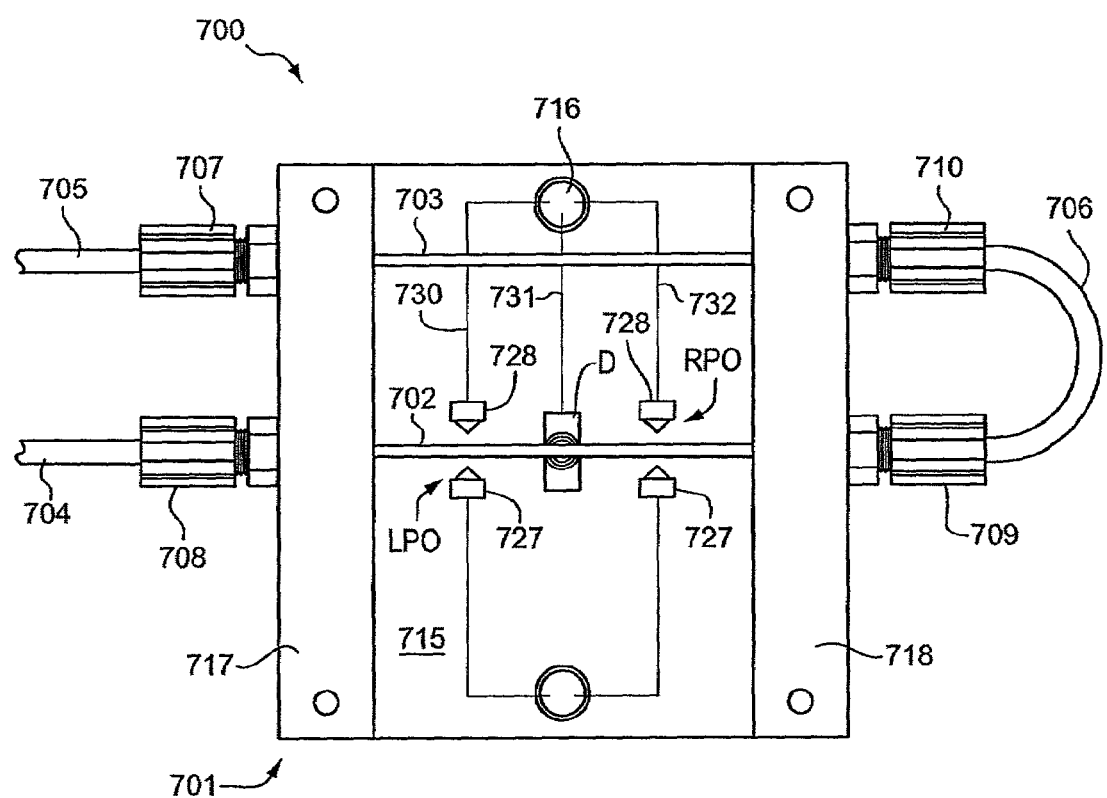
FIGS. 7 and 8 disclose a flowmeter having optical pick-offs.
Figure 8:
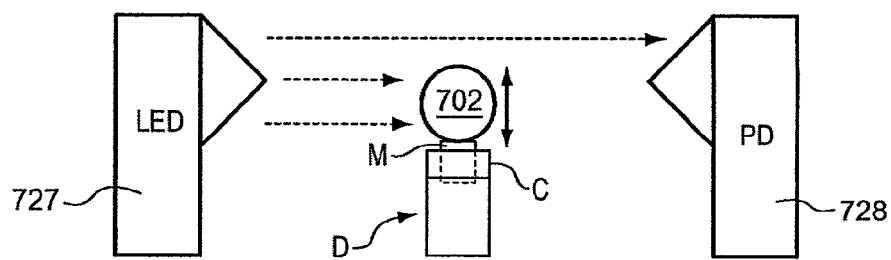

Description of FIGS. 7 and 8

FIG. 7 discloses a top view of a flowmeter 700 comparable to flowmeter 100 of FIG. 1. The difference between the two embodiments is that flowmeter 700 uses an optical detector for pick-offs LP0 and RP0. The details of the optical detectors are shown in FIG. 8 as comprising a LED light source and photo-diode together with a flow tube 702, with portions 720 made opaque in order to facilitate use, interposed between the LED and photo-diode. At the rest position of the flow tube, a nominal amount of light passes from the LED to the photo-diode to generate a nominal output signal. A downward movement of the flow tube increases the amount of light received by the photo-diode; an upward movement of the flow tube decreases the amount of light received by the photo-diode. The amount of light received by the photo-diode translates to an output current indicative of the magnitude of the Coriolis vibration for the portion of the flow tube 702 associated with the LED and the light source. The output of the photo-diodes are extended over conductors 730 and 732 to meter electronics not shown in FIG. 7 to minimize drawing complexity. The embodiment of FIG. 7 is otherwise identical in every respect to the embodiment of FIG. 1 and includes supply tubes 704, exit tube 705 together with process connections 707 through 710 flow tubes 702 and exit tube 703. The parts of flowmeter 700 and their counterparts on FIG. 1 and are designated to facilitate the correspondence with the only difference being the first digit of the designation of each element.

Figure 9:
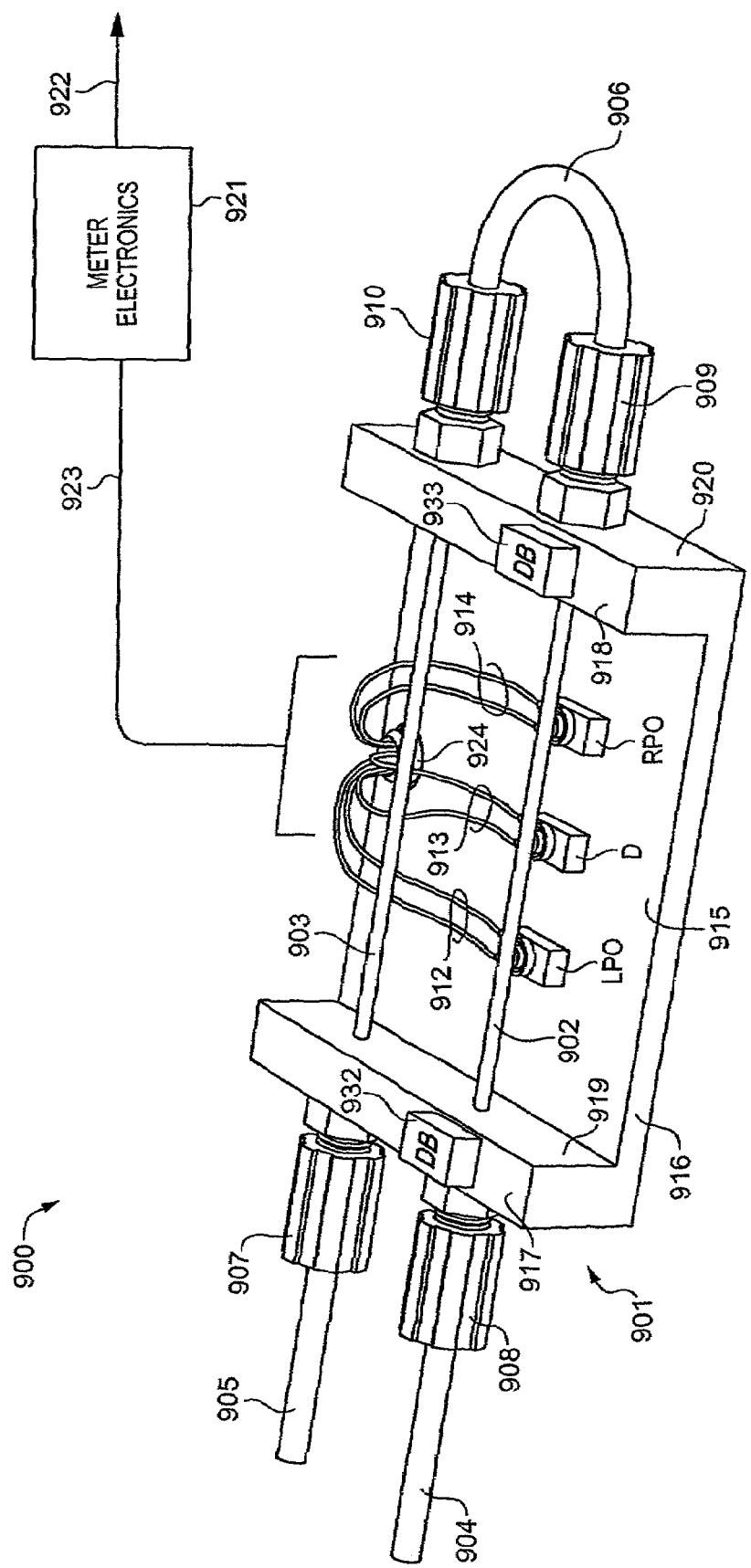
FIGS. 9 and 10 disclose flowmeters having dynamic balancers.

Description of FIG. 9

FIG. 9 discloses flowmeter 900 which corresponds to flowmeter 100 of FIG. 1 except that flowmeter 900 is equipped with dynamic balancers 932 and 933. Base 901 is smaller and of less mass than 101 of FIG. 1. The dynamic balancers function to counteract the vibrations imparted to legs 917 and 918 of base 901 by the dynamically unbalanced structure comprising the material filled vibrating flow tube 902. In the embodiment of FIG. 1, these vibrations are absorbed by the massive base 101. In this embodiment, the material filled flow tube with the attached magnets weigh approximately 2 grams while the base weighs approximately 12 pounds. This limits the range of commercial applications for the flow tube of FIG. 1 since the upper limit on the size and mass of the material filled vibrating flow tube 102 is limited by the mass of the base that must be provided to absorb unbalanced vibrations. Using the 3,000 to 1 ratio between the mass of the base and the mass of the material filled vibrating flow tube, an increase of one pound in the mass of the material filled flow tube would require an increase of mass of 3,000 pounds for base 101. This clearly limits the range of commercial applications in which the flow tube 100 of FIG. 1.

Flowmeter 900 of FIG. 9 has a wider range of commercial applications since the dynamic balancers 932 and 933 are affixed to legs 917 and 918 to absorb much of the vibrations imparted to the legs by the dynamically unbalanced vibrating flow tube 902. In practice, dynamic balancers (DB) may be of any type including the conventional mass and spring configuration as is well known in the art of dynamic balancers.

Figure 10:
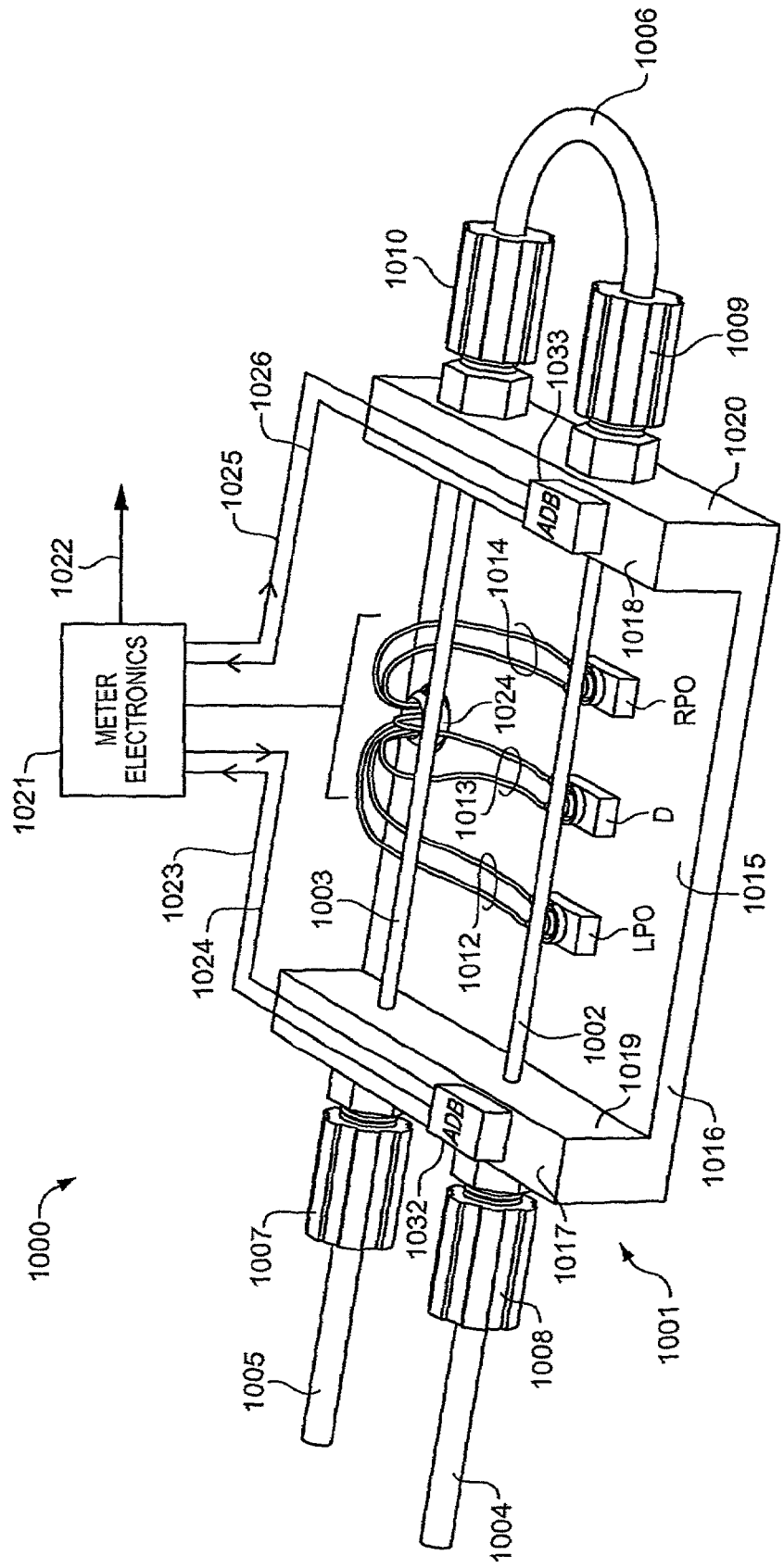

Description of FIG. 10

FIG. 10 discloses a flowmeter 1000 that is identical to flowmeter 900 except that the dynamic balancers of FIG. 10 are of the active type (ADB) and are designated 1032 and 1033. These active dynamic balancers are controlled by an exchange of signals with meter electronics 1021 over paths 1023, 1024, 1025 and 1026. Meter electronics 1021 receives signals over path 1023 from active dynamic balancer 1032 representing the vibrations applied by the dynamically unbalanced vibrating flow tube 1002 to leg 1017. Meter electronics receive these signals and generates a control signal that is applied over path 1024 to active dynamic balancer 1032 to counteract the flow tube vibrations. Operating in this manner, active dynamic balancer 1032 can be controlled to reduce the vibrations of leg 1017 to whatever magnitude may be desired so that the resulting mass of base 1001 may be of an acceptable level for commercial use of flowmeter 1000. The active dynamic balancer 1033 mounted atop leg 1018 of base 1001 operates in the same manner as described for the active dynamic balancer mounted to leg 1017.

Figure 11:
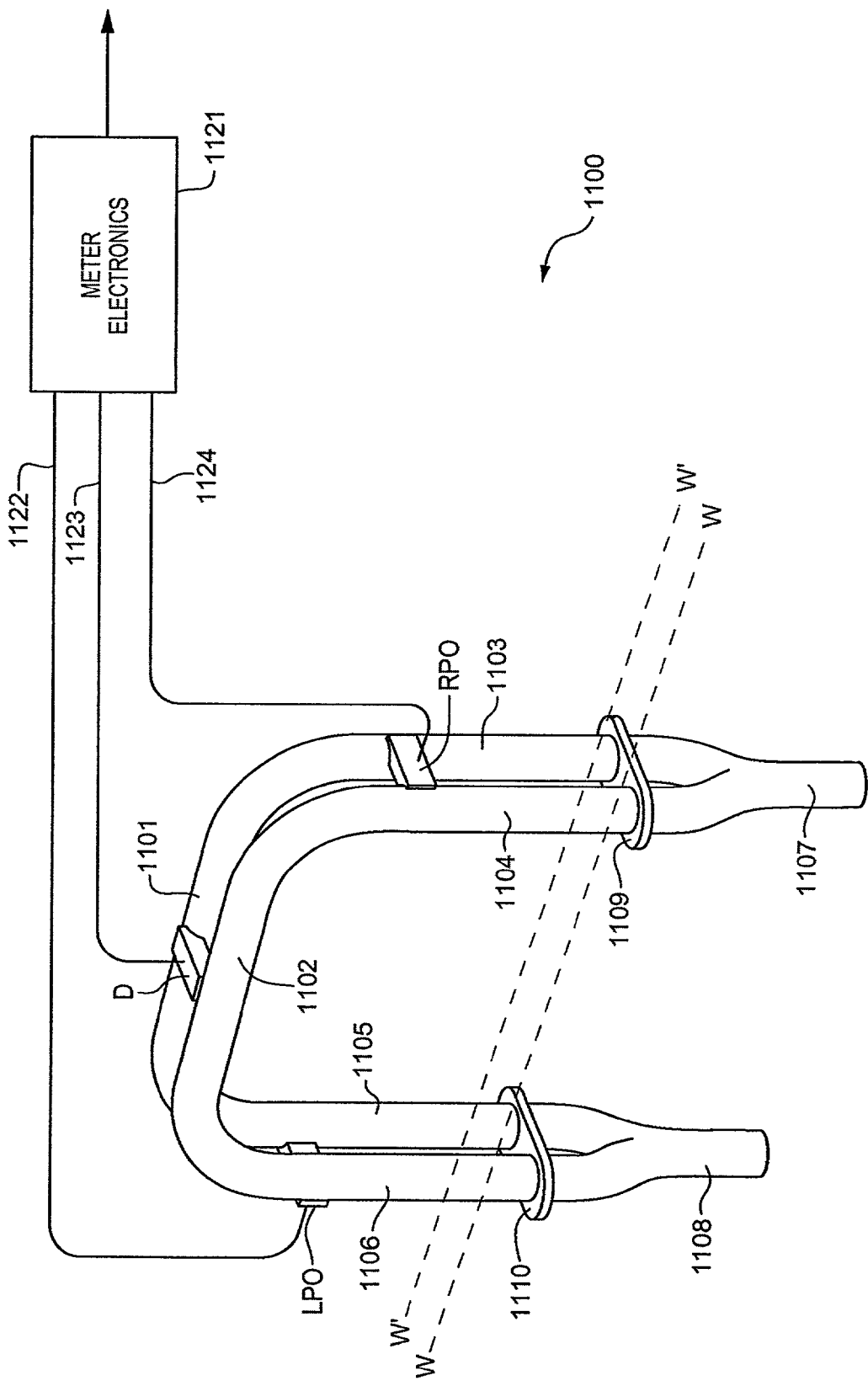
FIG. 11 discloses a flowmeter having a pair of substantially U-shaped flow tubes.

Description of FIG. 11

FIG. 11 discloses yet another alternative embodiment comprising a flowmeter 1100 having dual flow tubes 1101, 1102 which are substantially U-Shaped and have right side legs 1103, 1104 and left side legs 1105, 1106. The bottom portion of the side legs are connected to form "Y" sections 1107 and 1108 which may be connected to a suitable base not shown to minimize drawing complexity. The dual flow tubes of flowmeter 1100 vibrate as dynamically balanced elements around the axes W—W and W'—W' of brace bars 1109 and 1110. Flow tubes 1101 and 1102 are driven in phase opposition by driver D affixed to the top portion of the U-shaped flow tubes. The Coriolis deflections imparted by the vibrating material filled flow tubes are detected by right pick-off RP0 and left pick-off LP0. Meter electronics 1121 functions to apply signals over path 1123 to cause driver D to vibrate flow tubes 1101, 1102 in phase opposition. The Coriolis response detected by pick-offs LP0 and RP0 as transmitted over paths 1122, 1124 to meter electronics 1121 which processes the signals and derives material flow information which is transmitted over output path 1124 to a utilizations circuit not shown.

Figure 12:
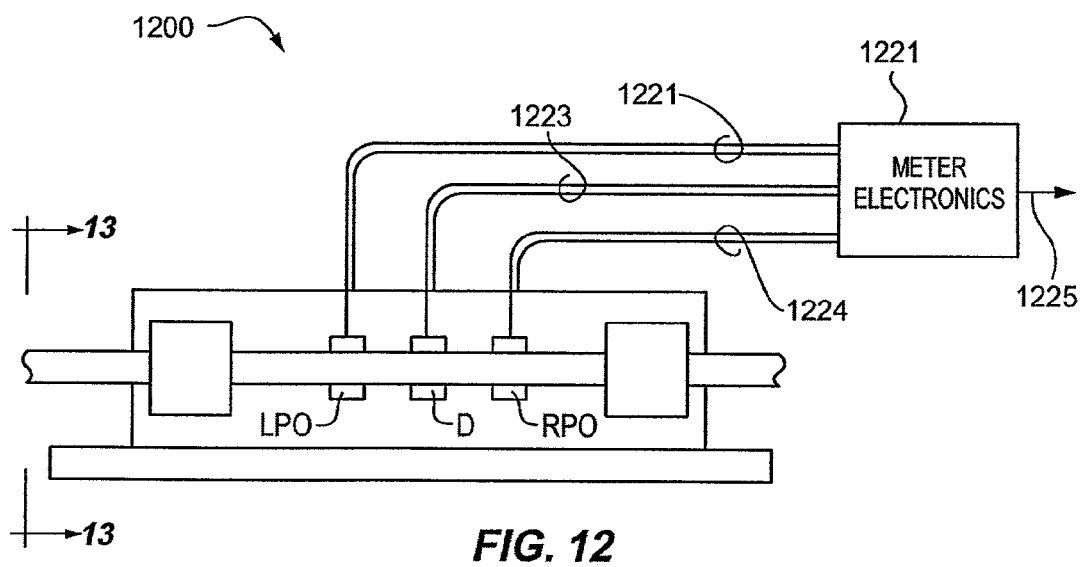
FIGS. 12 and 13 discloses another embodiment of a flowmeter having a pair of dynamically balanced straight flow tubes.
Figure 13:
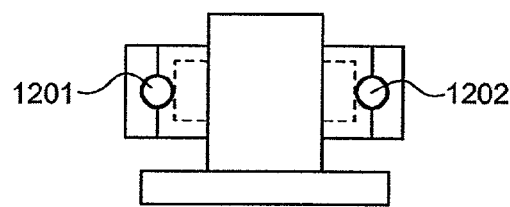

Description of FIGS. 12 and 13

FIGS. 12 and 13 disclose a dynamically balanced flowmeter 1200 having a pair of flow tubes 1201 and 1202 which are vibrated in phase opposition by driver D. The flow tubes receive a material flow; driver D vibrates the flow tubes in phase opposition in response to a drive signal received over path 1223 from meter electronics 1221. The Coriolis response of the material filled vibrating flow tubes is detected by pick-offs LP0 and RP0 with their output being applied over conductors 1221 and 1224 to meter electronics which processes the received signals to generate material flow information that is applied over output path 1225 to a utilization circuit not shown.

Figure 14:
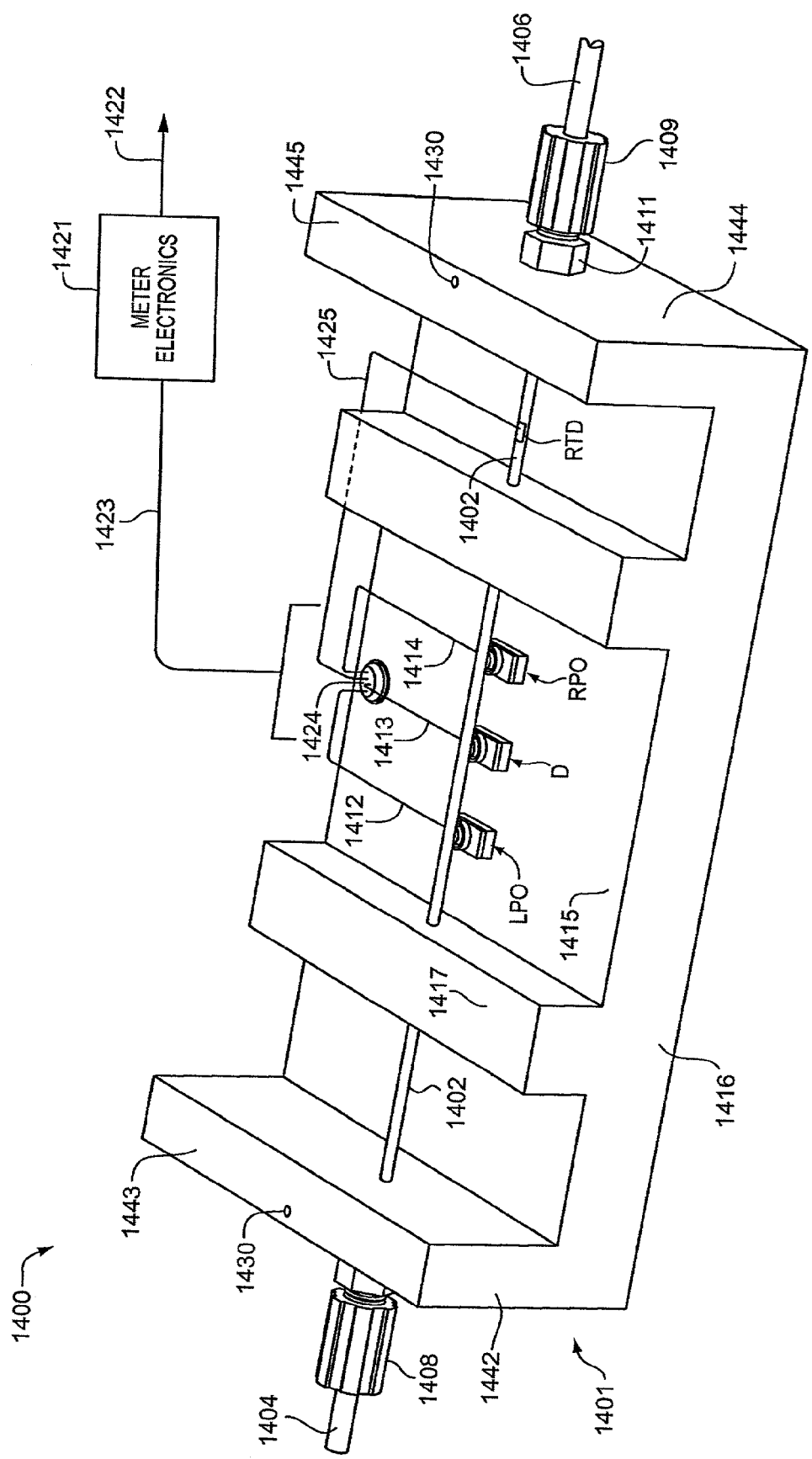
FIG. 14 discloses an alternative embodiment having a single flow tube and no return tube.

Description of FIG. 14

FIG. 14 discloses an alternative embodiment 1400 of the invention comprising a massive base 1401 having an outer pair of upwardly extending sidewalls 1443 and 1444 as well as an inner pair of upwardly extending sidewalls 1417 and 1418. A single flow tube 1402 extends from an input process connection 1408 on the left through the four upwardly extending sidewalls to an output process connection 1409 on the right. The flow tube 1402 is vibrated by driver D with the resulting Coriolis deflections of the vibrating flow tube with material flow being detected by pickoffs LP0 and RP0 which transmit signals over the indicated paths to meter electronics 1421 which functions in the same manner as priorly described or FIG. 1. Temperature sensing element RTD senses the temperature of the material filled flow tube and transmits this information over path 1425 to meter electronics 1421.

The flowmeter of FIG. 14 differs from that of FIG. 1 in two notable respects. The first is that the embodiment of FIG. 14 is only a single flow tube 1402. The material flow extends through this flow tube from input process connection 1408; the output of the flow tube is applied via output process connection 1409 to output tube 1406 for delivery to a user. The embodiment of FIG. 14 does not have the return flow tube comparable to element 103 of FIG. 1.

Also, the massive base 1401 has two pairs of upwardly extending walls whereas in the embodiment of FIG. 1 the massive base 101 had only the single pair of upwardly extending walls 117 and 118. The single pair of walls in FIG. 1 performed the function of being a zero motion vibrational node as well as a mounting for process connections 107 through 110. On FIG. 14, the inner pair of walls 1417 and 1418 function as a zero motion vibrational node for the ends of the active portion of flow tube 102. The outer pair of upwardly extending walls 1443 and 1444 mount process connections 1408 on the left and 1409 on the right.

When in use, process material is received from tube 1404 connected to process connection 1408. The inlet of flow tube 1402 is also connected to process connection 1408. Flow tube 1402 extends the process material flow to the right through the two pairs of sidewalls to output process connection 1409 to which is connected the output tube 1406.

The part numbers on FIG. 14 not specifically mentioned immediately above are analogous to and perform the functions identical to their corresponding elements on the previous FIGS. including FIG. 1.

Figure 15:
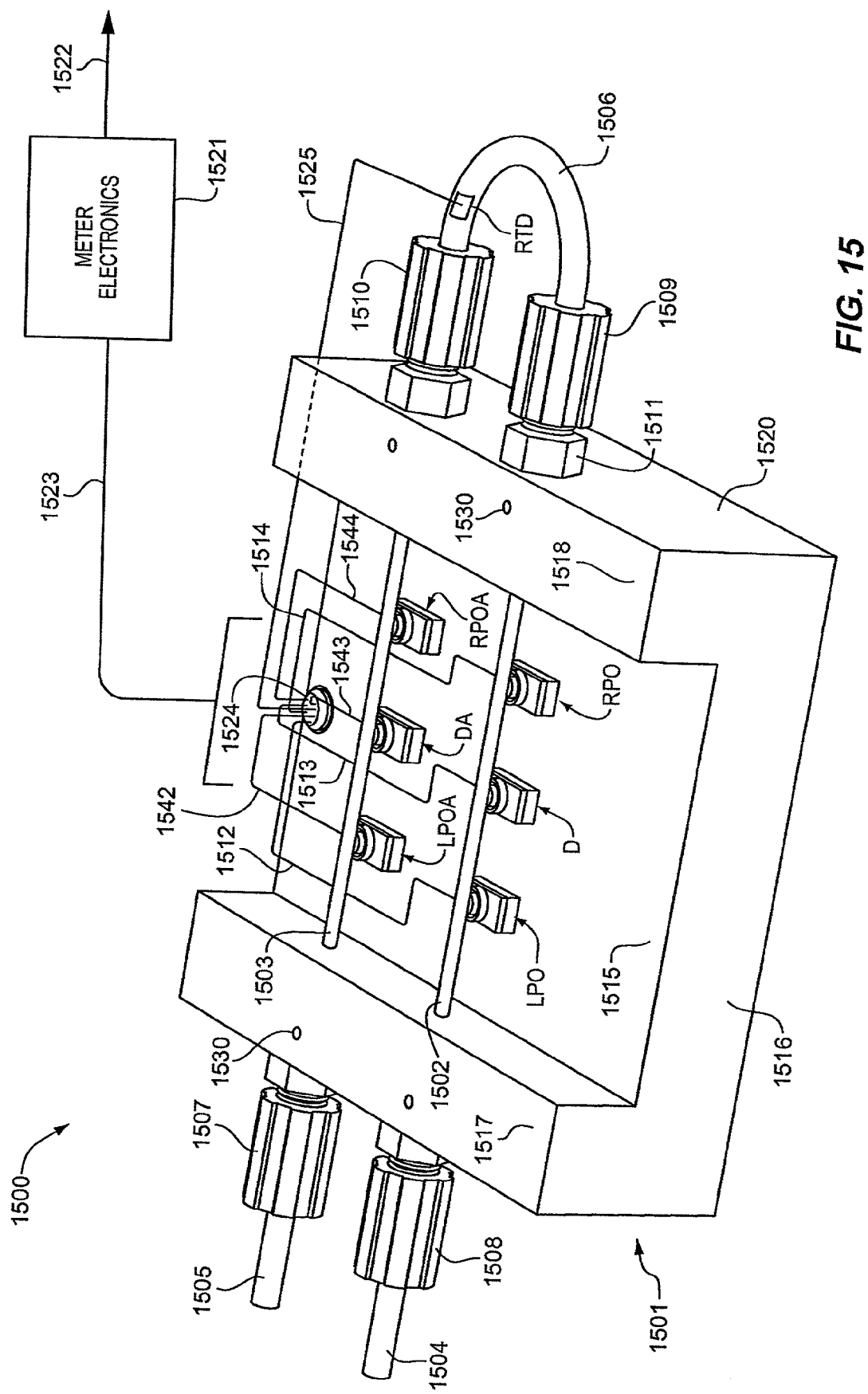
FIG. 15 discloses an alternative embodiment having two flow tubes vibrated in phase opposition.

Description of FIG. 15

FIG. 15 discloses an alternative embodiment 1500 which is similar in most respects to the embodiment of FIG. 1. The primary difference is that in the embodiment of 1500, the rear flow tube 1503 is not dormant as is return tube 103 of the embodiment of FIG. 1. Instead, on FIG. 15, rear tube 1503 is vibrated by its driver DA with the resulting Coriolis deflections of this vibrating tube with material flow being detected by its pickoffs LP0A and RP0A. Their output signals are transmitted over paths 1542 and 1544 to meter electronics 1521 which receives these signals as well as signals from pickoffs LP0 and RP0 of flow tube 1502 to generate material flow information.

The process material flows to right on FIG. 15 through flow tube 1502, through tube 1500 and flows to the left through flow tube 1503. This phase reversal of mated pickoffs can be compensated by reversing the connections to pickoffs LP0A and RP0A so that the Coriolis signals from all pickoffs received by meter electronics 1521 are additive to enhance meter sensitivity.

The parts shown on FIG. 15 not specifically mentioned above are identical in function to their corresponding elements on FIG. 15.

Figure 16:
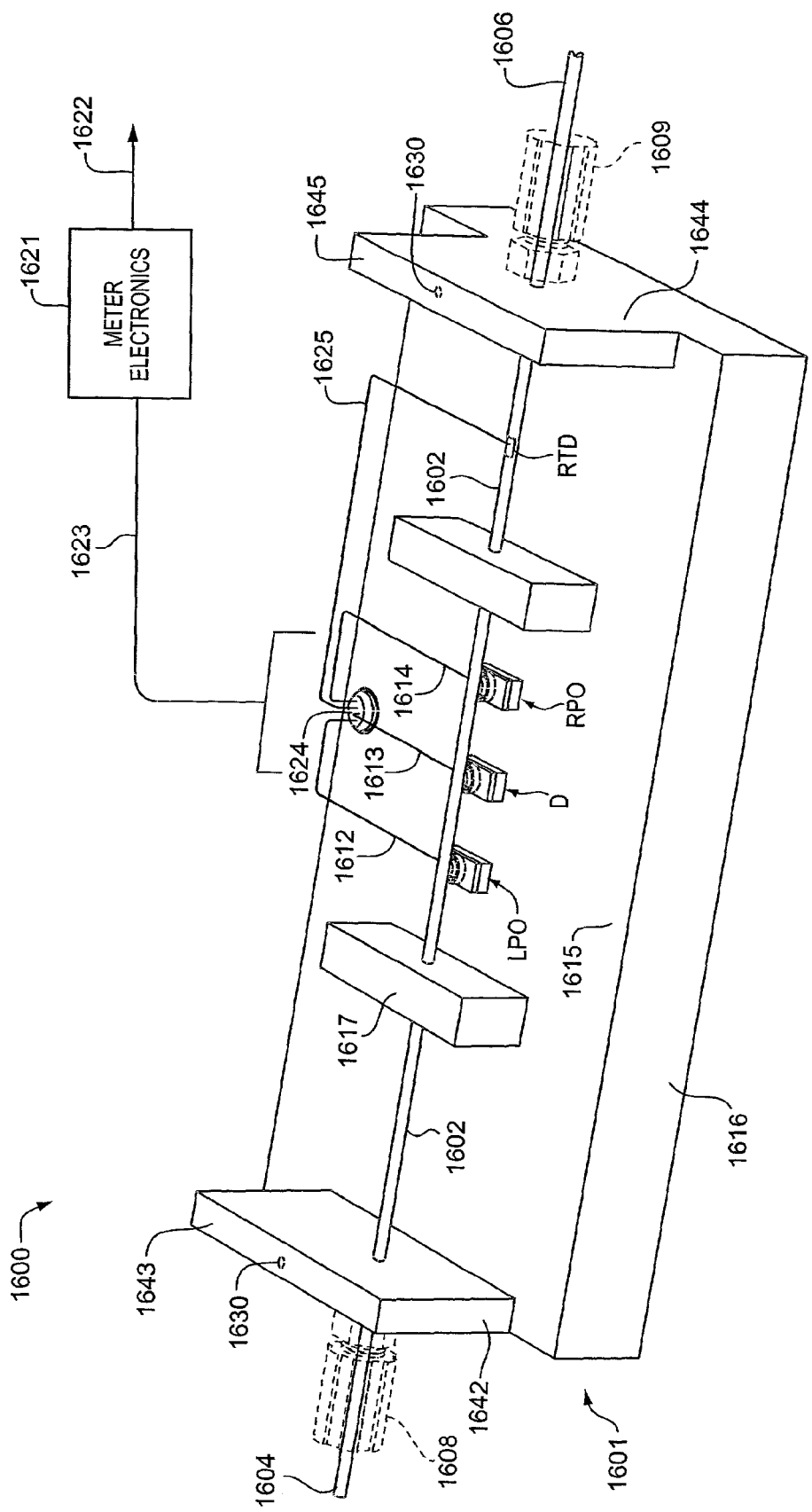
FIG. 16 discloses an alternative embodiment having a single flow tube.

Description of FIG. 16

FIG. 16 discloses an alternative embodiment 1600 that is similar to the embodiment of FIG. 14. The differences are that upwardly extending inner mounting posts 1617 and 1618 replace walls 1417 and 1418 of FIG. 14. Also upwardly extending outer mounting posts 1643 and 1645 replace walls 1443 and 1445 of FIG. 14. Outer posts 1643 and 1645 prevent flow tube 1602 from pivoting about post 1617 and 1618 as an axis. Connectors 1608 and 1609 are optional and if desired flow tube 1602 may extend outwardly through posts 1643 and 1645 and replace inlet tube 1604 and outlet tube 1402. The extended flow tube may be connected downstream and upstream by a user to the user's equipment. When connected to users equipment the flow tube 1602 can be attached to process connection 1608 and 1609 in a similar fashion as shown in detail in FIG. 4. In addition, flow 1602 tube can be attached to process connections similar in design as described in FIG. 4. with the nipple and movable portion of the process connection being located at each end. This allows a compression fitting from flow tube 1602 to the process connection and also a compression fitting from the users equipment to the same process connection. Posts 1443 and 1445 serve as a mounting for connector 1608 and 1609 when provided.

It is to be expressly understood that the claimed invention is not to be limited to the description of the preferred embodiment but encompasses other modifications and alterations within the scope and spirit of the inventive concept. For example, the flowmeter embodiments shown herein may be operated in an upside down orientation it is desired to have the driver D positioned on top of a vibrating flow tube to allow the driver heat to move upward away from the flow tube. This can better isolate the flow tube from thermal stress that might degrade the accuracy or the output data of the flowmeter. Also, the Coriolis flowmeter herein disclosed has applications other than those herein disclosed. For example the disclosed Coriolis flowmeter may be used in applications in which the flowing process material is corrosive, such as nitric acid, and incompatible for use with flow meters having a metal wetted flow path.

What is claimed:

1. A method of manufacturing a Coriolis flowmeter adapted to extend a received process material flow having an ultra high level of purity free from contamination due to ion transfer from said Coriolis flow meter to said process material; said method comprising the steps of:
coupling a flow tube means to a base, wherein said flow tube means is formed entirely from PTFE or PFA;
affixing a driver to said flow tube means;
coupling a pick-off means to said flow tube means;
affixing inlet and outlet ends of said flow tube means to at least one process connection; and characterized in that said step of coupling said flow tube means to said base is proceeded by the step of etching said flow tube means to create a surface suitable for coupling and affixing flowmeter components.

2. The method of claim 1 characterized in that said etching step comprises the step of using an etching solution containing a glycol diether.

3. The method of claim 1 characterized in that said etching step comprises the step of heating an etching solution to an elevated temperature.

4. The method of claim 1 characterized in that said etching step comprises the step of agitating said flow tube means in an etching solution.

5. A method of manufacturing a Coriolis flowmeter adapted to extend a received process material flow having an ultra high level of purity free from contamination due to ion transfer from said Coriolis flow meter to said process material; said method comprising the steps of:
coupling a flow tube means to a base, wherein said flow tube means is formed entirely from PTFE or PFA;
affixing a driver to said flow tube means;
coupling a pick-off means to said flow tube means; and
affixing inlet and outlet ends of said flow tube means to at least one process connection; and
characterized in that said step of coupling said flow tube means to said base is proceeded by the step of straightening said flow tube means to eliminate any inherent curvature or unwanted residual bends.

6. The method of claim 5 characterized in that said straightening step comprises the steps of:
placing said flow tube means in a straightening fixture;
heating said flow tube means and said straightening fixture;
cooling said flow tube means and said straightening fixture; and
removing said flow tube means from said straightening fixture.

7. A method of manufacturing a Coriolis flowmeter adapted to extend a received process material flow having an ultra high level of purity free from contamination due to ion transfer from said Coriolis flow meter to said process material; said method comprising the steps of:
coupling a flow tube means to a base, wherein said flow tube means is formed entirely from PTFE or PFA;
affixing a driver to said flow tube means;
coupling a pick-off means to said flow tube means; and
affixing inlet and outlet ends of said flow tube means to at least one process connection; and
characterized in that said step of coupling said flow tube means to said base comprises the step of attaching said flow tube means to said base using adhesive.

8. The method of claim 7 characterized in that said step of coupling said flow tube means to said base using said adhesive comprises the step of using cyanoacrylate adhesive.

9. A method of manufacturing a Coriolis flowmeter adapted to extend a received process material flow having an ultra high level of purity free from contamination due to ion transfer from said Coriolis flow meter to said process material; said method comprising the steps of:
coupling a flow tube means to a base, wherein said flow tube means is formed entirely from PTFE or PFA;
affixing a driver to said flow tube means;
coupling a pick-off means to said flow tube means; and
affixing inlet and outlet ends of said flow tube means to at least one process connection; and
characterized in that said step of affixing said driver means to said flow tube means further comprises the step of attaching said driver means to said flow tube means using adhesive.

10. The method of claim 9 characterized in that said step of affixing said driver means to said flow tube means further comprises the step of using cyanoacrylate adhesive.

11. A method of manufacturing a Coriolis flowmeter adapted to extend a received process material flow having an ultra high level of purity free from contamination due to ion transfer from said Coriolis flow meter to said process material; said method comprising the steps of:
coupling a flow tube means to a base, wherein said flow tube means is formed entirely from PTFE or PFA;
affixing a driver to said flow tube means;
coupling a pick-off means to said flow tube means; and
affixing inlet and outlet ends of said flow tube means to at least one process connection; and
characterized in that said step of coupling said pick-off means to said flow tube means further comprises the step of attaching said pick-off means to said flow tube means using adhesive.

12. The method of claim 11 characterized in that said step of coupling said pick-off means to said flow tube means further comprises the step of using cyanoacrylate adhesive.

13. A method of manufacturing a Coriolis flowmeter adapted to extend a received process material flow having an ultra high level of purity free from contamination due to ion transfer from said Coriolis flow meter to said process material; said method comprising the steps of:
coupling a flow tube means to a base, wherein said flow tube means is formed entirely from PTFE or PFA;
affixing a driver to said flow tube means;
coupling a pick-off means to said flow tube means; and
affixing inlet and outlet ends of said flow tube means to at least one process connection;
coupling said at least one process connection to said base by forming a receiving hole into said base; and securing a fixed element of said process connection into said receiving hole.

14. The method of claim 13 characterized in that the step of securing said fixed element of said process connection into said receiving hole comprises the step of adhering said fixed element of said process connection into said receiving hole.

15. The method of claim 14 characterized in that said step of adhering said fixed element of said process connection into said receiving hole further comprises the step of using cyanoacrylate adhesive.

16. The method of claim 13 characterized in that said step of coupling said process connection to said base comprises the step of adhering a fixed element of said process connection onto said base.

17. The method of claim 16 characterized in that said step of adhering said process connection to said base further comprises the step of using cyanoacrylate adhesive.

18. A method of manufacturing a Coriolis flowmeter adapted to extend a received process material flow having an ultra high level of purity free from contamination due to ion transfer from said Coriolis flow meter to said process material; said method comprising the steps of:
coupling a flow tube means to a base, wherein said flow tube means is formed entirely from PTFE on PFA;
affixing a driver to said flow tube means;
coupling a pick-off means to said flow tube means;
affixing inlet and outlet ends of said flow tube means to at least one process connection; and
characterized in that said step of affixing said ends of said flow tube means to said at least one process connection comprises the steps of:
flaring said end of said flow tube means; and
inserting said flared end of said flow tube means onto conical stub of said at least one process connection.

19. A method of manufacturing a Coriolis flowmeter adapted to extend a received process material flow having an ultra high level of purity free from contamination due to ion transfer from said Coriolis flow meter to said process material; said method comprising the steps of:
coupling a flow tube means to a base, wherein said flow tube means is formed entirely from PTFE or PFA;
affixing a driver to said flow tube means;
coupling a pick-off means to said flow tube means;
affixing inlet and outlet ends of said flow tube means to at least one process connection; and
characterized in that said step of affixing said end of said flow tube means to said at least one process connection comprises the steps of:
inserting said end of said flow tube means through said at least one process connection until said end of said flow tube means are flush with face of said at least one process connection; and
sealing said end of said flow tube means to said face of said at least one process connection.

20. The method of claim 19 characterized in that said step of sealing said end of said flow tube means to said face of said at least one process connection comprises the step of adhering said end of said flow tube means to said face of said at least one process connection.

21. The method of claim 19 characterized in that said step of sealing said end of flow tube means to said face of said at least one process connection comprises the step of laser welding said end of said flow tube means to said face of said at least one process connection.

22. A method of manufacturing a Coriolis flowmeter adapted to extend a received process material flow having an ultra high level of purity free from contamination due to ion transfer from said Coriolis flow meter to said process material; said method comprising the steps of:
coupling a flow tube means to a base, wherein said flow tube means is formed entirely from PTFE or PFA;
affixing a driver to said flow tube means;
coupling a pick-off means to said flow tube means;
affixing inlet and outlet ends of said flow tube means to at least one process connection; and
characterized in that said step of coupling said pick-off means to said flow tube means comprises the step of making portions of said flow tube means opaque in order to facilitate use of optical pick-offs.

* * * * *